United States Patent
Hierro Domenech et al.

(10) Patent No.: US 10,981,333 B2
(45) Date of Patent: Apr. 20, 2021

(54) ADDITIVE MANUFACTURING APPARATUS AND METHOD WITH FUSING AGENT PRESENCE DETERMINED BY TEMPERATURE MEASUREMENT

(71) Applicant: HEWLETT-PACKARD DEVELOPMENT COMPANY, L.P., Houston, TX (US)

(72) Inventors: Lluis Hierro Domenech, Sant Llorenc d'Hortons (ES); Esteve Comas, Sant Quirze del Valles (ES); Sergi Culubret, Sant Cugat del Valles (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 147 days.

(21) Appl. No.: 16/089,997

(22) PCT Filed: Apr. 26, 2016

(86) PCT No.: PCT/EP2016/059324
§ 371 (c)(1),
(2) Date: Sep. 28, 2018

(87) PCT Pub. No.: WO2017/186278
PCT Pub. Date: Nov. 2, 2017

(65) Prior Publication Data
US 2019/0111626 A1    Apr. 18, 2019

(51) Int. Cl.
*B29C 64/386* (2017.01)
*B33Y 10/00* (2015.01)
(Continued)

(52) U.S. Cl.
CPC .......... *B29C 64/386* (2017.08); *B29C 64/165* (2017.08); *B33Y 10/00* (2014.12);
(Continued)

(58) Field of Classification Search
CPC ..... B29C 64/386; B29C 64/165; B33Y 10/00; B33Y 30/00; B33Y 50/02; B22F 2003/1057
See application file for complete search history.

(56) References Cited

U.S. PATENT DOCUMENTS

2004/0200816 A1* 10/2004 Chung .................. B29C 64/153
                                                                    219/121.83
2005/0001356 A1*  1/2005 Tochimoto ............. B29C 64/35
                                                                    264/308
(Continued)

FOREIGN PATENT DOCUMENTS

| GB | 2526905 | 12/2015 |
|---|---|---|
| WO | WO-2006034012 | 3/2006 |
| WO | WO-2015108546 | 7/2015 |

OTHER PUBLICATIONS

Song et al. 'Feedback Control of Melt Pool Temperature During Laser Cladding Process' IEEE Transactions on Control Systems Technology, vol. 19, No. 6, Nov. 2011.*
(Continued)

*Primary Examiner* — Bernard G Lindsay
(74) *Attorney, Agent, or Firm* — Dierker & Kavanaugh PC (57) ABSTRACT

In an example, a method includes forming a layer of build material and selectively applying fusing agent on to the layer based on a predetermined pattern. Energy may be applied to the layer of build material, and at least one temperature of the layer may be measured. A temperature distribution over the layer of build material may be determined, the temperature distribution indicating, for each of a plurality of locations on the layer of build material, whether fusing agent is present at that location. At least one characteristic derived from the temperature distribution may be compared to a predetermined characteristic. When the compared charac- (Continued)

teristics differ, an operational characteristic of an additive manufacturing apparatus may be adjusted.

11 Claims, 5 Drawing Sheets

(51) Int. Cl.
*B33Y 30/00* (2015.01)
*B33Y 50/02* (2015.01)
*B29C 64/165* (2017.01)
*B22F 10/10* (2021.01)

(52) U.S. Cl.
CPC .............. *B33Y 30/00* (2014.12); *B33Y 50/02* (2014.12); *B22F 10/10* (2021.01)

(56) References Cited

U.S. PATENT DOCUMENTS

| | | | |
|---|---|---|---|
| 2008/0262659 A1* | 10/2008 | Huskamp | G05D 23/27 700/300 |
| 2010/0125356 A1* | 5/2010 | Shkolnik | G06T 5/006 700/98 |
| 2012/0258250 A1 | 10/2012 | Rodgers | |
| 2013/0344258 A1 | 12/2013 | Covey | |
| 2014/0271964 A1* | 9/2014 | Roberts, IV | B29C 64/106 425/150 |
| 2014/0314613 A1* | 10/2014 | Hopkinson | B33Y 10/00 419/55 |
| 2015/0064047 A1* | 3/2015 | Hyde | B23K 26/144 419/26 |
| 2015/0331402 A1 | 11/2015 | Lin et al. | |
| 2015/0352639 A1* | 12/2015 | Toyserkani | B33Y 30/00 428/201 |
| 2016/0074965 A1* | 3/2016 | Jakimov | H05B 6/06 219/76.12 |
| 2016/0236279 A1* | 8/2016 | Ashton | B29C 64/153 |
| 2018/0050494 A1* | 2/2018 | Coeck | B29C 64/393 |

OTHER PUBLICATIONS

Leigh, et al., A Simple, Low-Cost Conductive Composite Material for 3D Printing of Electronic Sensors, PLOS ONE, Nov. 21, 2012, p. 1-6, vol. 7 Issue 11.
International Search Report and Written Opinion for International Publication No. PCT/EP2016/059324 dated Jan. 2, 2017, 10 pages.

* cited by examiner

ADDITIVE MANUFACTURING APPARATUS AND METHOD WITH FUSING AGENT PRESENCE DETERMINED BY TEMPERATURE MEASUREMENT

BACKGROUND

Additive manufacturing techniques may generate a three-dimensional object on a layer-by-layer basis through the solidification of a build material. In examples of such techniques, build material is supplied in a layer-wise manner and a solidification method may include heating the layers of build material to cause melting in selected regions. In other techniques, other solidification methods, such as chemical solidification methods, may be used.

BRIEF DESCRIPTION OF DRAWINGS

Non-limiting examples will now be described with reference to the accompanying drawings, in which.

DETAILED DESCRIPTION

Additive manufacturing techniques may generate a three-dimensional object through the solidification of a build material. In some examples, the build material may be a powder-like granular material, which may for example be a plastic, ceramic or metal powder. The properties of generated objects may depend on the type of build material and the type of solidification mechanism used. Build material may be deposited, for example on a print bed and processed layer by layer, for example within a fabrication chamber.

In some examples, selective solidification is achieved through directional application of energy, for example using a laser or electron beam which results in solidification of build material where the directional energy is applied. In other examples, at least one print agent may be selectively applied to the build material, and may be liquid when applied. For example, a fusing agent (also termed a 'coalescence agent' or 'coalescing agent') may be selectively distributed onto portions of a layer of build material in a pattern derived from data representing a slice of a three-dimensional object to be generated (which may for example be generated from structural design data). The fusing agent may have a composition which absorbs energy such that, when energy (for example, light or heat) is applied to the layer, the build material coalesces and solidifies to form a slice of the three-dimensional object in accordance with the pattern. In other examples, coalescence may be achieved in some other manner.

In addition to a fusing agent, in some examples, a print agent may comprise a coalescence modifying agent (referred to as modifying or detailing agents herein after), which acts to modify the effects of a fusing agent for example by reducing or increasing coalescence or to assist in producing a particular finish or appearance to an object, and such agents may therefore be termed detailing agents. A coloring agent, for example comprising a dye or colorant, may in some examples be used as a fusing agent or a modifying agent, and/or as a print agent to provide a particular color for the object.

As noted above, additive manufacturing systems may generate objects based on structural design data. This may involve a designer generating a three-dimensional model of an object to be generated, for example using a computer aided design (CAD) application. The model may define the solid portions of the object. To generate a three-dimensional object from the model using an additive manufacturing system, the model data can be processed to generate slices of parallel planes of the model. Each slice may define a portion of a respective layer of build material that is to be solidified or caused to coalesce by the additive manufacturing system.

Figure 1:
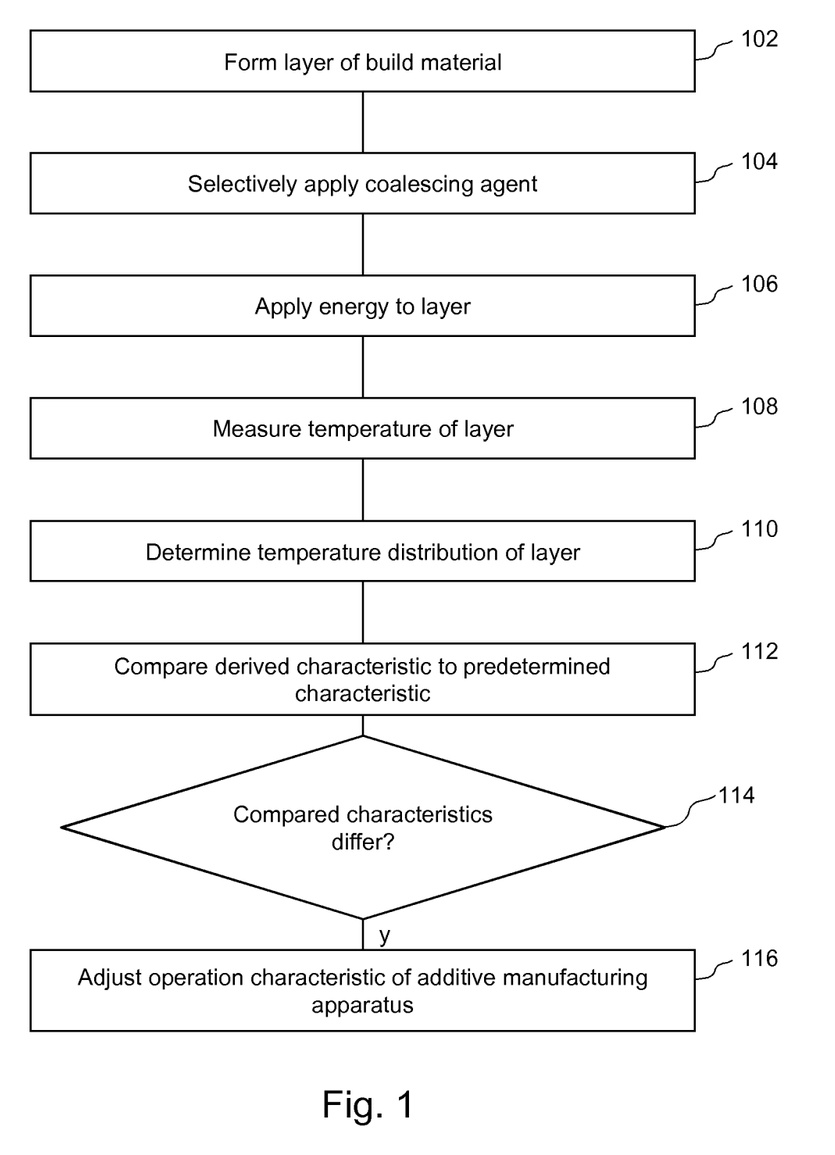
FIG. 1 is a flowchart of an example method of adjusting an operational characteristic of an additive manufacturing apparatus.

FIG. 1 is an example of a method comprising, in block 102, forming a layer of build material. For example, a first or subsequent layer of build material may be provided on a print bed. Block 104 comprises selectively applying of fusing agent on to the layer of build material based on a predetermined pattern. For example, this pattern may be derived from object model data representing an object to be generated by an additive manufacturing apparatus by fusing a build material. Such object model data may for example comprises a Computer Aided Design (CAD) model, and/or may for example be a STereoLithographic (STL) data file, and may for example specify a material distribution (e.g. identifying the solid portions) in a 'slice' of the object.

Block 106 comprises applying energy to the layer of build material, for example using an energy source, to cause coalescence of build material on which fusing agent is applied. This may comprise applying heat, for example using a heat lamp, to the layer of build material, or may be some other energy source. In block 108, the temperature of the layer of build material is measured. This may be using any type of temperature sensors. In some examples the temperature may be measured using a thermal imaging camera.

Block 110 comprises determining a temperature distribution over the layer. As noted above, the presence of fusing agent increases the absorption of energy and therefore a location bearing fusing agent will be hotter than a location which is free of fusing agent. In this example, the temperature distribution indicates for each of a plurality of locations on the layer of build material, whether fusing agent is present at that location. In other words, the temperature distribution has sufficient resolution to distinguish between locations of the layer of build material which bear fusing agent (or bear fusing agent at least in a quantity or concentration which is above a threshold), and locations which do not (or which bear a quantity/concentration of fusing agent which is below a threshold). The resolution of the temperature distribution (e.g. the size of each of the locations, or the number of locations per unit area) may for example be associated with an intended manufacturing tolerance level for the object being generated. The locations may be thermal imaging pixels. In some examples, the thermal imaging resolution may be matched to or based on the resolution with which fusing agent is applied (e.g. associated with the resolution of an agent distributor). In some examples, the temperature distribution may be determined with a sufficient resolution to distinguish a boundary region, for example a region of the build material adjacent to a region to which a fusing agent has been applied, and into which the coalescing material has diffused or spread, for example under a 'wicking' action. In other words, there may be plurality of locations associated with the width of a boundary area. The resolution with which the temperature distribution is captured may be determined by a resolution of a temperature sensor and/or a distance between the temperature sensor and a layer of build material. The temperature distribution may comprise an indication of the relative spatial arrangement of at least two locations.

Block 112 comprises comparing at least one characteristic derived from the temperature distribution to a predetermined characteristic. The characteristic derived from the temperature distribution may for example be a 'heat map' indicating, from the temperatures thereof, the locations to which fusing agent has been applied, and the predetermined characteristic may comprise a map of the intended location of fusing agent, for example based on the pattern. In some examples, predetermined characteristic may for example comprise a model temperature distribution, for example indicative of a predicted temperature distribution associated with an intended application of fusing agent (for example, application according to the pattern). In some examples, therefore, the predetermined characteristic may be derived from the pattern used in block 104. In some examples, the predetermined characteristic may be a model which is indicative of intended thermal 'edge' behaviour, for example indicative of an acceptable amount of thermal bleeding, which may be associated with the applied fusing agent spreading or diffusing to regions of the build material to which it is not directly applied.

In block 114, it is determined if the compared temperature distributions differ (in some examples, differ by more than a threshold amount). If so, in block 116, an operational characteristic of an additive manufacturing apparatus is adjusted.

In some examples, the operational characteristic may be related to the application of at least one print agent. In some examples, the operational characteristic may be related to a print head alignment. In some examples, such an operational characteristic may comprise an offset from a nominal position (which in some examples may be zero prior to adjustment thereof, i.e. the position of the print head when the temperature is measured may be considered to be the nominal position). In other examples, it may comprise an offset to be applied to a pattern, i.e. data indicating where a pattern is to be applied may be adjusted to counteract a misalignment of the print head. In some examples, therefore, the operational characteristic may relate to the intended placement or location of an applied print agent. In some examples, the operational characteristic may be related to an application amount of at least one print agent.

In some examples, the amount of energy applied may be adjusted, for example by adjusting the intensity of radiation emitted by an energy source. The intensity of energy may be modified so as to provide enough energy to cause build material to which fusing agent has been applied to melt, but not build material with a lower concentration of fusing agent (for example, the intensity may be reduced until any material which is not intended to fuse is below a fusing temperature).

Figure 2A:
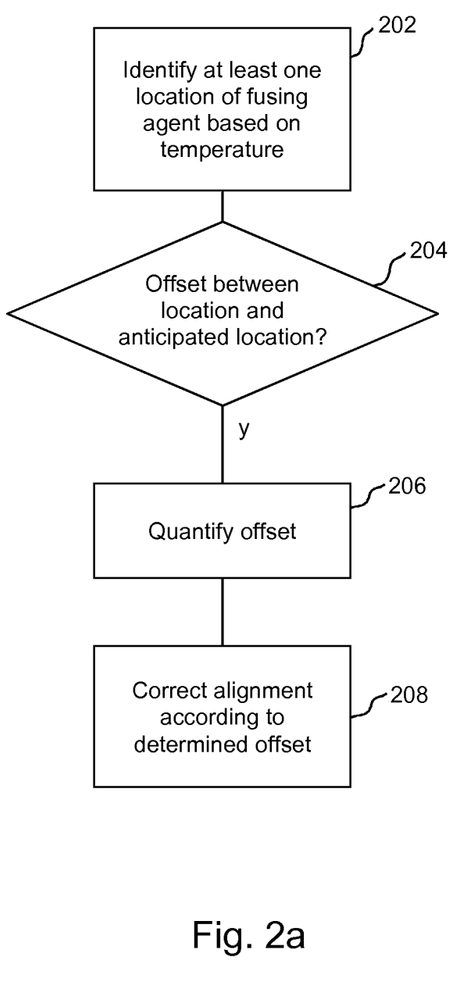
FIGS. 2a and 2b are flowcharts of example methods for adjusting operational characteristic(s) of an additive manufacturing apparatus.
Figure 2B:
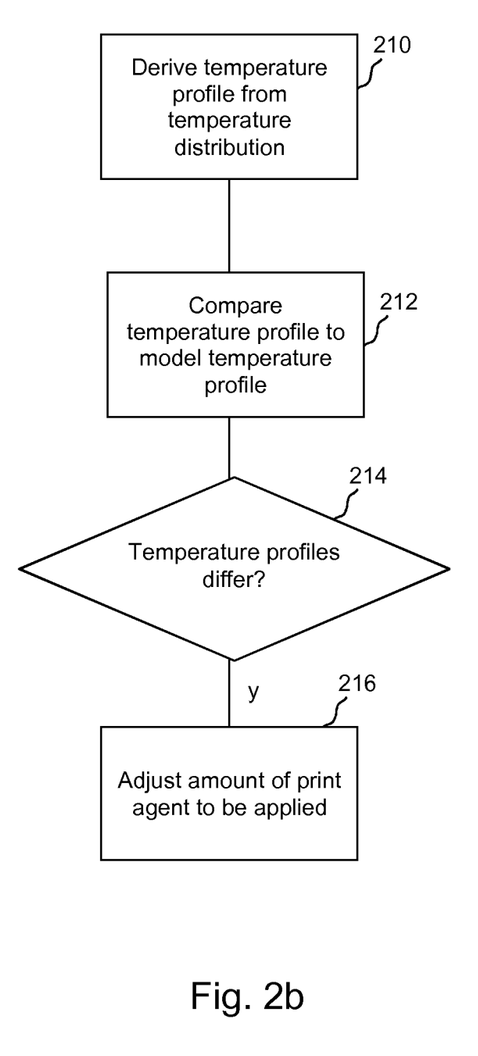

FIGS. 2*a* and 2*b* show examples of methods of carrying out blocks 112-116. Block 202 of FIG. 2*a* comprises deriving a fusing agent location on a layer of build material on a print bed from the temperature distribution, which in this example comprises identifying at least one location of fusing agent using the temperature of that location. In block 204, it is determined if there is an offset between at least one anticipated location of fusing agent and at least one determined location of fusing agent. In other words, in such an example, the characteristic derived from the temperature distribution may be an indication of the location(s) at which fusing agent is present on the print bed/layer of build material and the predetermined characteristic may be a model of the anticipated location(s) of fusing agent based on the pattern. This may for example be used to identify a shift between a thermal pattern indicating the location of hotter regions of the build material and the intended location of the pattern of build material. As noted above, locations which bear fusing agent absorb more energy from an energy source than those that do not. Therefore, a heat map of a layer of build material can indicate the portions of the build material on the print bed to which fusing agent has been applied. This can be compared to an intended location of fusing agent, for example based on the pattern used to determine where the fusing agent should be placed. The presence of such a shift may be indicative of a lack of alignment of the agent distribution apparatus. For example, any print agent may be applied to the layer of build material using an agent distributor which scans across the surface of the layer, selectively dispensing print agents. Such an agent distributor may be, or may have become, misaligned with the print bed.

If it is determined in block 204 that there is an offset, block 206 comprises quantifying the offset. For example, if the layer of build material lies in an xy plane where x and y are orthogonal axes, any shift in the x direction may be quantified separately to any shift in the y direction (although any coordinate system could be used). Such a shift may be quantified in any measurement scale, for example in using a unit of a position detecting apparatus associated with print apparatus (for example, an encoder or the like), a column width associated with control of the agent distribution apparatus, a number of thermal imaging pixels (i.e. a number of discrete locations for which the temperature is measured) or the like. In block 208, an operational characteristic comprising the alignment of an agent distributor of the additive manufacturing apparatus is corrected according to the determined offset.

In summary, therefore, in this example, a degree of offset of a heat pattern in the layer of build material from the pattern with which agent is intended to be applied (for example, an x shift and/or a y shift) is used to determine an agent distributor alignment correction. In other examples, the degree of offset could be used to perform a virtual realignment, for example applying a shift to the pattern so as to counteract a misalignment of an agent distributor. In general, the pattern may be dynamically modified based on thermal feedback.

In FIG. 2*b*, block 210 comprises deriving a characteristic from the temperature distribution which is indicative of a temperature profile (i.e. a profile of a temperature change within the layer). Block 212 comprises comparing this derived characteristic to a predetermined characteristic, which is indicative of a model temperature profile.

For example, a temperature profile associated with an edge region of applied fusing agent may be considered. The predetermined characteristic may be indicative of range of acceptable profiles.

In some examples, the profile may be indicative of the location of an edge region, and may therefore be used to determine an offset between the intended location of the edge of a region to which fusing agent has been applied, and a region which is (at least substantially) free of fusing agent. However, the temperature of the build material may be indicative not just of the presence or absence of fusing agent thereon, but also of the amount (which may be related to the number of drops per unit area, or the concentration of the fusing agent or the like) of fusing agent. Therefore, if fusing agent spreads or diffuses into a region of the build material to which it is not directly applied, that build material will absorb more energy than build material which is completely or substantially free of fusing agent, and may therefore be at a higher temperature. This may cause unwanted effects, for example if the build material absorbs sufficient energy such that it is caused to fuse in a location where, according to the pattern, it should not.

In this example, the compared characteristics relate to the form of the temperature profile, for example, over how many locations (e.g. thermal imaging pixels) does the temperature fall by a predetermined amount. In some examples the temperature profile is compared to a predetermined threshold profile (which may for example be based on a model of the thermal behaviour of the materials used). For example, the predetermined profile may comprise a characteristic form or shape. Block 214 comprises determining if the compared characteristics (in this example, the temperature profiles) differ (for example, by more than a threshold amount) and, if so, block 216 comprises adjusting an amount of at least one print agent to be applied to the layer of build material by the additive manufacturing apparatus. For example, the characteristic may be a threshold temperature decay rate, such that, for example, the temperature reduces by n° C. in over m locations (which may be thermal imaging pixels), where n and m are any number. In some examples, the predetermined characteristic may be associated for example with a fusing temperature of the build material, such that there is no pixel which is indicated as being above the fusing temperature and which is outside the region indicated in the pattern used to determine where build material is applied (or outside a predetermined perimeter around that pattern).

The amount of print agent may be an amount (e.g. a concentration, density and/or contone level) of fusing agent and/or an amount of modifying agent. Changing an amount of fusing agent may comprise changing the fusing agent in at least a region of the edge of the pattern. For example, if there is less fusing agent applied, it is less likely to spread into neighbouring regions. Changing an amount of modifying agent may comprise changing a modifying agent, for example a detailing agent, in at least a region of an edge. Some such agents can reduce the temperature of the build material during object generation, for example as they may be reflective, not absorb energy as well as fusing agents, or are evaporated, which has a cooling effect. This may therefore counteract the presence of fusing agent, which may be associated with an increase in temperature. Moreover, increasing such agents may counteract the tendency of fusing agent to spread, for example by saturating the build material.

In another example, the amount of energy applied, for example the intensity of the radiation emitted by an energy source may be adjusted. Changing the amount of energy may change the amount or concentration of print agent which may be applied with the result that fusion occurs/does not occur. For example, for a heat lamp irradiating the print bed at a high temperature, a building material bearing n drops of fusing agent per unit area may fuse. However, at a lower temperature (energy is reduced), m drops of fusing agent per unit area may be applied before fusion occurs, where m is greater than n. Therefore, reducing the amount of energy may for example allow a higher concentration of fusing agent to bleed into surrounding material while still leaving that surrounding material unfused. This may in turn mean that an edge is more sharply defined.

In some examples, the adjustments to the apparatus operational characteristic(s) in blocks 116, 206, 212 may be made during generation of a particular object, for example as a feedback loop which adjusts operational characteristic(s) between layers, for example to resolve an offset between the intended location of the pattern and the actual location of the pattern, or to reflect the diffusion behaviour of print agents in the build material given the particular material combinations or environment conditions for that object. In another example, the method may be employed in a calibration phase, for example in generating at least one layer of a test object.

Figure 3A:
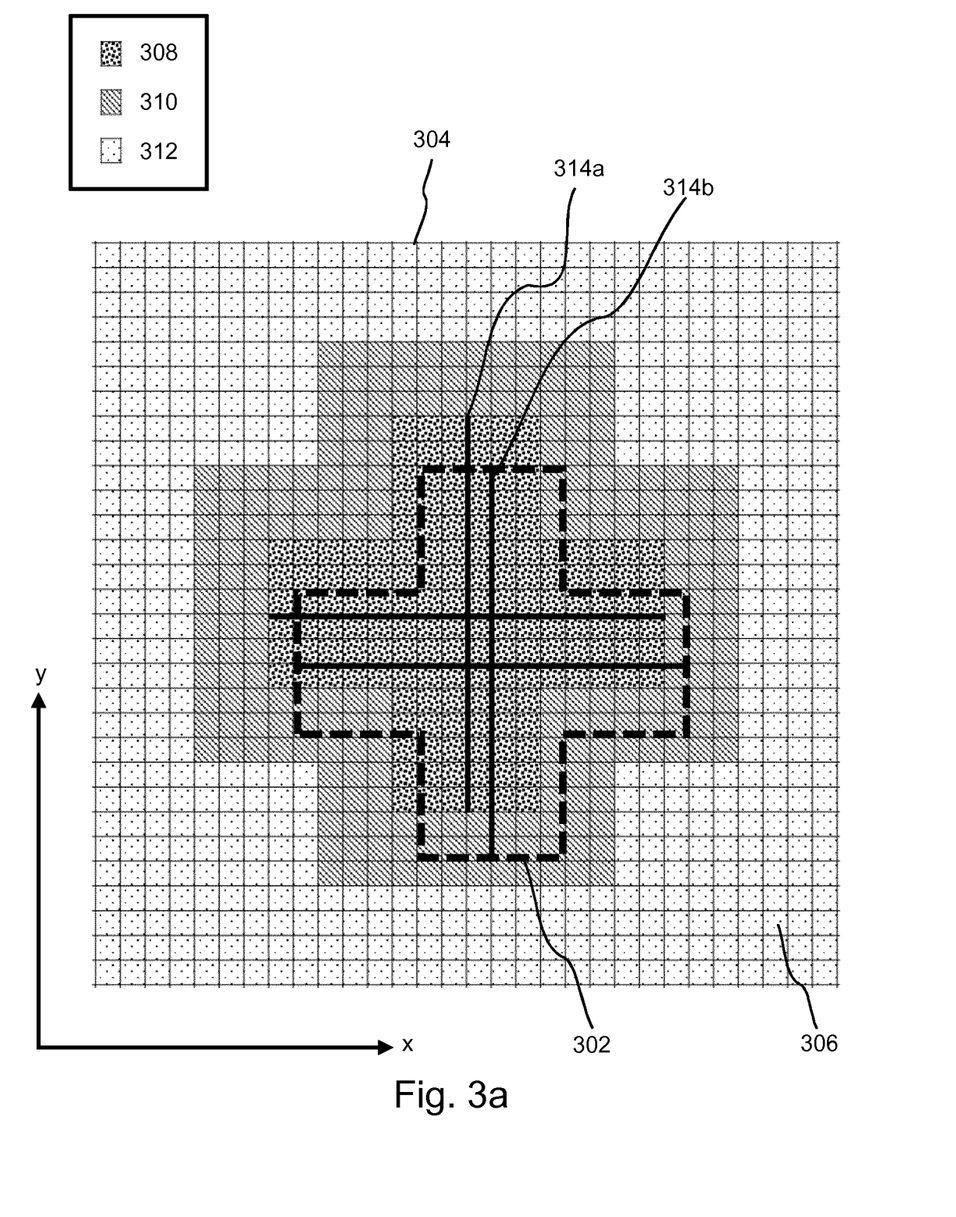
FIGS. 3a-c are schematic diagrams of example temperature distributions.
Figure 3B:
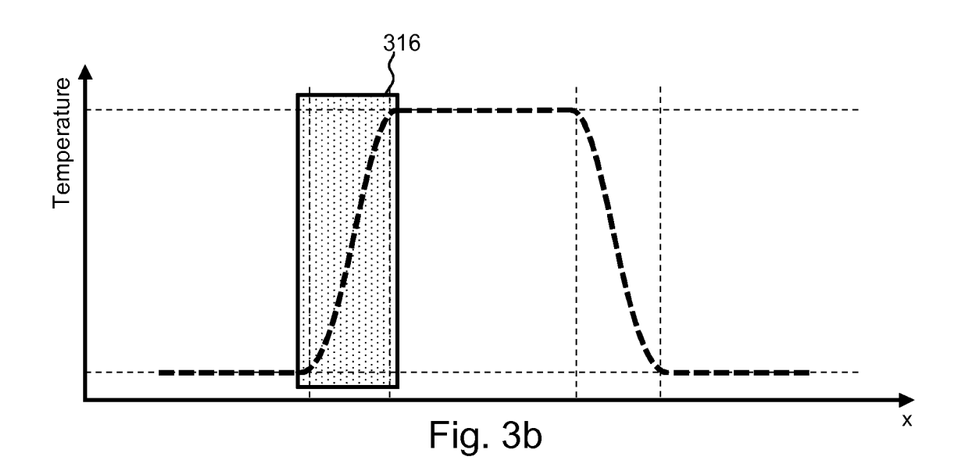
Figure 3C:
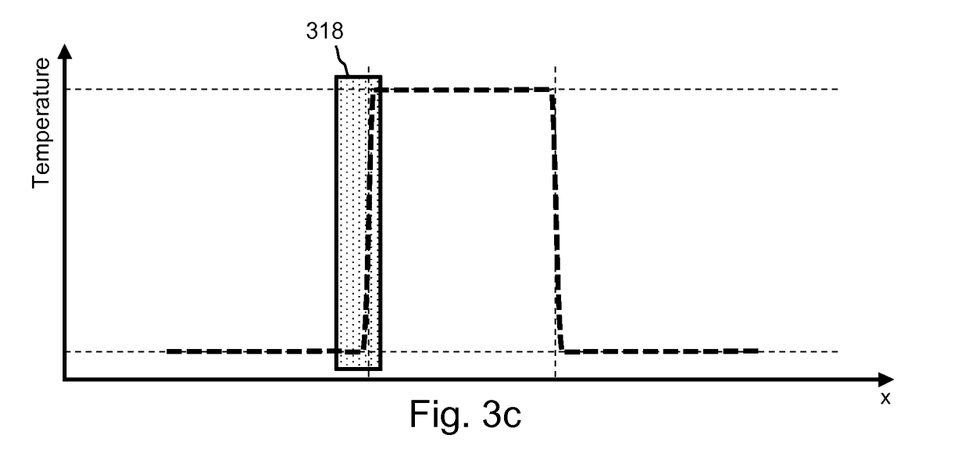

FIGS. 3*a*-*c* show illustrative examples in relation to temperature distributions. In FIG. 3*a*, a predetermined pattern of fusing agent to be applied comprises a cross shape 302 indicating the locations at which it is intended to apply fusing agent to a layer 304 of build material. A thermal imaging camera may capture a thermal image (or several thermal images as it is scanned across the surface of a print bed) which are used to derive a temperature distribution in the form of a heat map 306. In some examples a thermal sensor may be fixed above the print bed. The temperature may be determined for each of a plurality of locations across the surface, which is divided into imaging 'pixels' indicated by the grid lines, which in this example are 0.05 mm in length. In this example, each of the pixels belongs to one of three temperature zones: a high temperature zone 308, a mid-temperature zone 310 and a lower temperature zone 312.

In this example, it may be seen that pixels of the high temperature zone 308 form a cross which is offset from the cross shape 302 showing the intended location of the pattern. In some examples, a degree of offset may be determined on a pixel by pixel basis. In other examples, a characteristic may be derived from both the pattern and the thermal distribution. For example, this may comprise a perimeter, or, as in the example of FIG. 3, a medial axis 312*a*, 312*b*, or 'skeleton' of both crosses (i.e. identifying a line which is equidistant to the boundaries of the shapes) may be determined. Such medial axes 314*a*, 314*b* may in turn be used to determine an offset between the printed cross, which is identified as corresponding to the high temperature zone, and the cross shape 302. In this example, there is an x offset of +0.05 mm (one pixel) and a y offset of −0.1 mm (two pixels). This information may be used to correct an agent distributor alignment by 0.05 mm in the x direction and a y offset of −0.1 mm.

While in this example, the pixels have a dimension of 0.05 mm, in other examples, the pixels may have a dimension of around 0.01 mm, 0.1 mm, 0.5 mm, or the like. As the size of the pixel is related to the resolution of the temperature sensor, the resolution may be determined in order to result in a particular pixel size, which may for example be related to an intended resolution of manufacture.

A temperature profile is shown in cross section in FIG. 3*b*. In this example, there is a change in temperature which occurs over several pixels in a boundary region (i.e. over the mid-temperature zone 310). An anticipated, or intended 'model' temperature profile shown in cross section in FIG. 3*c*. It may be noted that, in this model profile, the temperature drops off more steeply (i.e. over fewer pixels).

In this example, it may be is determined that the average slope of the temperature profile in the highlighted region 316 seen in FIG. 3*b* is too low (i.e. the slope is too shallow) compared to that shown in the highlighted region 318 in FIG. 3c, and a correction to at least one of the fusing agent, modifying agent, and/or heat applied in a subsequent layer of object generation may be determined.

In some examples, the edge regions in which the thermal profile is considered may be identified by identifying a temperature zone having a temperature profile which meets predetermined characteristics (for example, which is associated with a predetermined temperature change within a predetermined number of locations/pixels, or which is associated with a temperature gradient over a predetermined number of locations/pixels). For example, the profile of FIG. 3b could be used to identify an edge. In other examples, edges of the pattern may be detected, and the temperature profile of regions of the layer corresponding to the edges (including any pattern offset if an offset exists) may be determined. In other examples, a region within a predetermined perimeter of the intended location of the pattern may be analysed to determine the thermal profile thereof.

Figure 4:
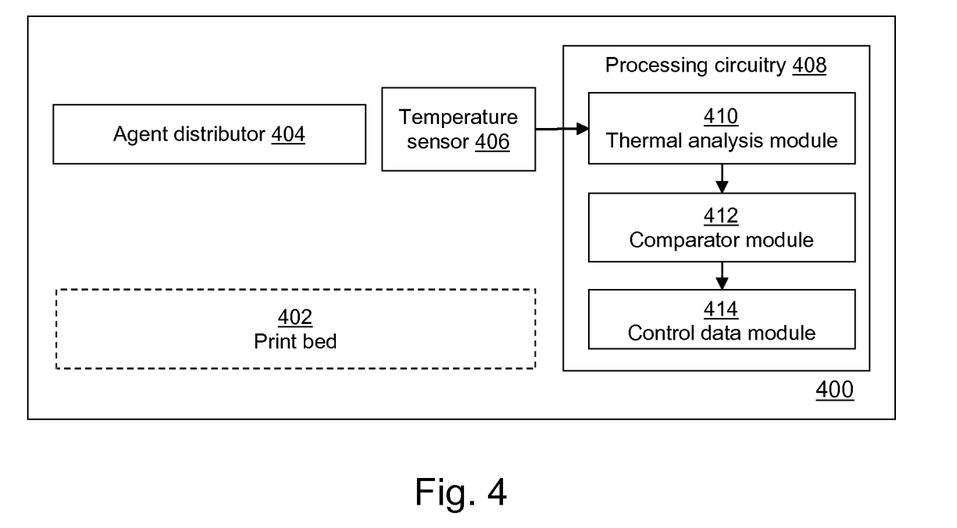
FIG. 4 is a simplified schematic drawing of an example additive manufacturing apparatus.

FIG. 4 is an example of an additive manufacturing apparatus 400 comprising an agent distributor 404, a temperature sensor 406 and processing circuitry 408. A print bed 402, which may be a removable component, may be provided in use of the additive manufacturing apparatus 400 to support a layer of build material. The agent distributor 404 may be controlled to selectively print a fusing agent onto a layer of build material on the print bed 402, for example according to a predetermined pattern. The temperature sensor 406, which may in some examples be a thermal camera, a thermal imaging array or the like, measures the temperature of each of a plurality of locations (e.g. thermal imaging pixels) over the layer of build material. In some examples, the temperature sensor 406 may be scanned across the print bed 402, for example in a plane substantially parallel thereto. In other examples, the temperature sensor 406 may have a fixed position.

The processing circuitry 408 comprises a thermal analysis module 410, a comparator module 412 and a control data module 414. The thermal analysis module 410 determines, using measurements of the temperature sensor 406, at least one temperature characteristic of the layer of build material indicative of the application of fusing agent to each of a plurality of locations thereon. The temperature characteristic may be a temperature distribution characteristic. The comparator module 412 compares the determined temperature characteristic with a predetermined characteristic. When the comparator module 412 determines that the determined temperature characteristic is different to the predetermined characteristic (in some examples, outside of a tolerance band of the predetermined characteristic), the control data module 414 determines an output indicative of an adjustment to the additive manufacturing apparatus.

In some examples, the thermal analysis module 410 determines at least one a characteristic which comprises or relates to a thermal edge profile, and the comparator module 412 compare a characteristic (for example, average slope, or shape) of the thermal edge profile with a predetermined characteristic. In other examples, the thermal analysis module 410 may determine a characteristic which identifies at least one temperature zone comprising temperature(s) above a threshold level, and the comparator module 412 may compare the location of the temperature zone with the intended location of fusing agent according to the pattern. This may, for example, comprise determining a heat map as set out in relation to FIG. 3a-c above. This may allow an offset between the intended and the actual location of fusing agent, and therefore a misalignment of the agent distributor 404, to be identified.

The control data module 414 may for example determine an output indicative of an adjustment to the alignment of the agent distributor 404, an amount of at least one print agent to be applied by the agent distributor 404, for example in subsequent layers of object generation, and/or an adjustment to an amount of energy supplied by an energy source, which may supply energy to the layer of build material. In such examples, the additive manufacturing apparatus 400 may further comprise an energy source (for example, a heat lamp, a light or radiation source, or the like). In some examples, the control data module 414 may adjust (for example, automatically) the alignment of the agent distributor 404, change an amount of at least one print agent to be applied by the agent distributor 404, and/or and adjust an energy source which may supply energy to the layer of build material to alter the amount of energy supplied thereby. In other examples, these may be manually adjusted, for example according to an indication provided to an operator.

In some examples, the agent distributor 404 and the temperature sensor 406 are mounted on a movable carriage, for example as described in relation to FIG. 5 below. The temperature sensor 406 may be mounted so as to be above the print bed 402, for example having a field of view which is towards the print bed 402.

The temperature sensor 406 may also be used in controlling other aspects of the apparatus, for example to provide feedback to a heat source for pre-heating build material; to provide feedback to an energy source for applying energy to cause coalescence; and/or to determine when a generated object is cooled. The temperature sensor 406 may be further used to measure the temperature of other parts of an additive manufacturing apparatus, for example a temperature of a spittoon, a web wipe or of a drop detector.

Figure 5:
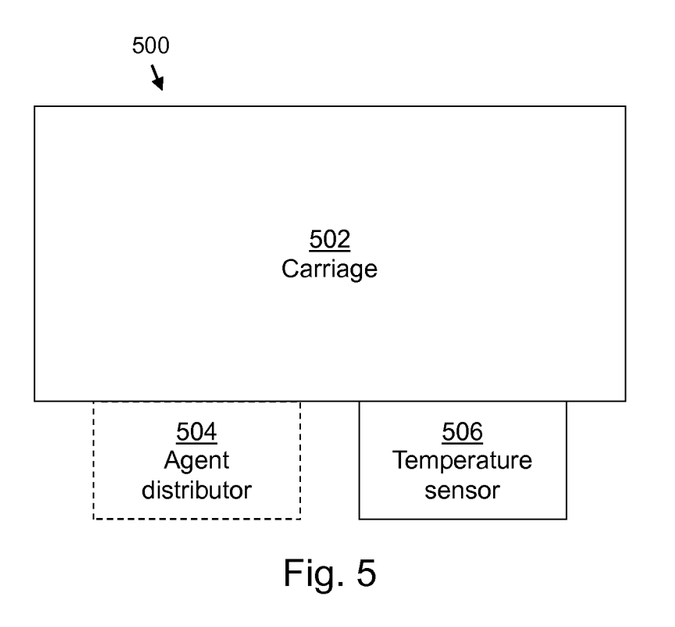
FIG. 5 is a simplified schematic drawing of example additive manufacturing agent distribution apparatus.

FIG. 5 is a schematic example of an additive manufacturing agent distribution apparatus 500 comprising a carriage 502 arranged to support an agent distributor 504 (shown in dotted line) to selectively deliver a fusing agent and having mounted thereon a temperature sensor 506. The carriage 502 is to be moveably mounted in an additive manufacturing apparatus (for example, an apparatus 400 as shown in FIG. 4) so as to scan the agent distributor 504 and the temperature sensor 506 over a surface of build material for manufacturing an object therein. In this example, the temperature sensor 506 is mounted on the underside of the carriage 502.

The temperature sensor 506 is arranged to measure a temperature at each of a plurality of locations of the build material. In examples, the temperature may be indicative of the application of fusing agent, i.e. the temperature sensor 506 may be sufficiently sensitive to distinguish between locations of build material to which fusing agent has been applied, and locations where it has not. The temperature sensor 506 may for example comprise a thermal imaging camera (which may comprise a sensor array) with a resolution which is at least the manufacturing resolution of the object (i.e., which reflects the manufacturing tolerance associated with an object to be generated), or additive manufacturing apparatus in which the additive manufacturing agent distribution apparatus 500 is to be installed. It may be intended that the temperature sensor 506 is to measure a predetermined number of locations comprising 'pixels', each of which is associated with an individual temperature, per unit area. In some examples, the print bed temperature may be in the range 145° C. to 190° C., and the temperature sensor may be operational in the range 0° C. to 600° C. By mounting the temperature sensor 506 on the carriage 502 (for example, on the underside thereof), the temperature sensor 506 may be relatively close to the print bed of an additive manufacturing apparatus (for example spaced from a layer of build material by between around 2 mm and 3 mm in some additive manufacturing apparatus). As the resolution and the maximum practical distance are related, by mounting the temperature sensor 506 close to the print bed, the resolution specification for the temperature sensor 506 may be reduced. In some examples, the temperature sensor 506 may be a video thermal imaging camera, for example, a digital video thermal imaging camera which records a thermal image as it is scanned across the surface. Such a temperature sensor 506 may have a relatively small field of view. The resolution of the temperature sensor 506 may in some examples be substantially the same resolution as position detecting apparatus used in positioning the carriage (for example, an encoder or the like). The temperature sensor 506 may be arranged to determine the temperature of locations/pixels having dimensions of around or less than 0.5 mm, or having dimensions of around or less than 0.1 mm, or having dimensions of around or less than 0.05 mm.

The temperature sensor 506 may be arranged so as to have a resolution which is suitable for detecting a thermal edge profile associated with a boundary region between a region of build material to which fusing agent has been applied and a region of build material which is (at least substantially) free of fusing agent. The boundary region may be associated with a region to which fusing agent may spread, and the temperature sensor 506 may be arranged to have a resolution such that several distinct temperatures are measured across such a region.

Examples in the present disclosure can be provided as methods, systems or machine readable instructions, such as any combination of software, hardware, firmware or the like. Such machine readable instructions may be included on a computer readable storage medium (including but is not limited to disc storage, CD-ROM, optical storage, etc.) having computer readable program codes therein or thereon.

The present disclosure is described with reference to flow charts and/or block diagrams of the method, devices and systems according to examples of the present disclosure. Although the flow diagrams described above show a specific order of execution, the order of execution may differ from that which is depicted. Blocks described in relation to one flow chart may be combined with those of another flow chart. It shall be understood that each flow and/or block in the flow charts and/or block diagrams, as well as combinations of the flows and/or diagrams in the flow charts and/or block diagrams can be realized by machine readable instructions.

The machine readable instructions may, for example, be executed by a general purpose computer, a special purpose computer, an embedded processor or processors of other programmable data processing devices to realize the functions described in the description and diagrams. In particular, a processor or processing apparatus may execute the machine readable instructions. Thus functional modules of the apparatus (such as the processing circuitry 408, thermal analysis module 410, comparator module 412 and control data module 414) may be implemented by a processor executing machine readable instructions stored in a memory, or a processor operating in accordance with instructions embedded in logic circuitry. The term 'processor' is to be interpreted broadly to include a CPU, processing unit, ASIC, logic unit, or programmable gate array etc. The methods and functional modules may all be performed by a single processor or divided amongst several processors.

Such machine readable instructions may also be stored in a computer readable storage that can guide the computer or other programmable data processing devices to operate in a specific mode.

Machine readable instructions may also be loaded onto a computer or other programmable data processing devices, so that the computer or other programmable data processing devices perform a series of operations to produce computer-implemented processing, thus the instructions executed on the computer or other programmable devices realize functions specified by flow(s) in the flow charts and/or block(s) in the block diagrams.

Further, the teachings herein may be implemented in the form of a computer software product, the computer software product being stored in a storage medium and comprising a plurality of instructions for making a computer device implement the methods recited in the examples of the present disclosure.

While the method, apparatus and related aspects have been described with reference to certain examples, various modifications, changes, omissions, and substitutions can be made without departing from the spirit of the present disclosure. It is intended, therefore, that the method, apparatus and related aspects be limited by the scope of the following claims and their equivalents. It should be noted that the above-mentioned examples illustrate rather than limit what is described herein, and that those skilled in the art will be able to design many alternative implementations without departing from the scope of the appended claims. Features described in relation to one example may be combined with features of another example.

The word "comprising" does not exclude the presence of elements other than those listed in a claim, "a" or "an" does not exclude a plurality, and a single processor or other unit may fulfil the functions of several units recited in the claims.

The features of any dependent claim may be combined with the features of any of the independent claims or other dependent claims.

The invention claimed is:
1. A method comprising:
  forming a layer of build material;
  selectively applying fusing agent on to the layer of build material based on a predetermined pattern;
  irradiating the layer of build material with fusing energy to cause build material on which fusing agent is applied to coalesce in accordance with the predetermined pattern;
  measuring at least one temperature of the irradiated layer of build material;
  determining a temperature distribution over the irradiated layer of build material, the temperature distribution indicating, for each of a plurality of locations on the irradiated layer of build material, whether fusing agent is present at that location;
  comparing at least one characteristic derived from the temperature distribution to a predetermined characteristic, the at least one characteristic being an indication of the location or locations at which fusing agent is present and the predetermined characteristic being a model of at least one anticipated location of fusing agent based on the predetermined pattern, the comparing comprising determining if there is an offset between at least one anticipated location of fusing agent and at least one location of fusing agent determined using the measured temperature thereof; and when the compared characteristics differ by an offset, adjusting an operational characteristic of an additive manufacturing apparatus.

2. The method according to claim 1 in which adjusting an operational characteristic of an additive manufacturing apparatus comprises adjusting an alignment of an agent distributor of the additive manufacturing apparatus.

3. The method according to claim 1 wherein:
the characteristic derived from the temperature distribution is indicative of a temperature profile and the predetermined characteristic is indicative of a model temperature profile.

4. The method according to claim 3 in which adjusting an operational characteristic of an additive manufacturing apparatus comprises adjusting at least one of:
an amount of at least one print agent to be applied to the layer of build material by the additive manufacturing apparatus, and
an amount of fusing energy supplied by an energy source used to apply the fusing energy.

5. The method according to claim 1 in which measuring the temperature of the irradiated layer of build material comprises scanning a thermal imaging camera over a surface of the irradiated layer of build material.

6. An additive manufacturing apparatus comprising:
an agent distributor to selectively print a fusing agent on a layer of build material according to control data;
an energy source to irradiate the layer of build material with fusing energy to cause build material on which fusing agent is printed to coalesce;
a temperature sensor to measure the temperature of each of a plurality of locations over the irradiated layer of build material arranged on a print bed; and
processing circuitry comprising:
a thermal analysis module to determine, using measurements of the temperature sensor, at least one temperature characteristic of the irradiated layer of build material on the print bed which is indicative of an application of fusing agent to each of a plurality of locations thereon;
a comparator module to compare the determined temperature characteristic with a predetermined characteristic which is a model of at least one anticipated location of fusing agent based on a predetermined pattern of fusing agent, wherein comparing the determined temperature characteristic with the predetermined characteristic comprises determining an offset between at least one anticipated location of fusing agent and at least one location of fusing agent determined using the measured temperature thereof; and,
a control data module to determine an output indicative of an adjustment to the additive manufacturing apparatus when the determined temperature characteristic and predetermined characteristic differ by an offset.

7. The additive manufacturing apparatus of claim 6 in which the agent distributor and the temperature sensor are mounted on a movable carriage.

8. The additive manufacturing apparatus of claim 6 in which the temperature sensor is mounted so as to be above the print bed.

9. The additive manufacturing apparatus of claim 6 in which the temperature sensor comprises a thermal imaging camera.

10. The additive manufacturing apparatus of claim 6 in which the thermal analysis module is to determine at least one thermal edge profile, and in which the comparator module is to compare a characteristic of the thermal edge profile with a predetermined characteristic.

11. The additive manufacturing apparatus of claim 6 in which:
the agent distributor is to selectively print the predetermined pattern of fusing agent according to control data;
the thermal analysis module is to determine at least one temperature zone comprising temperatures above a threshold level; and
the comparator module is to compare the location of the temperature zone with an intended location of fusing agent according to the pattern.

* * * * *